United States Patent Office 3,734,832
Patented May 22, 1973

3,734,832
FERMENTATION PROCESS FOR PRODUCING PHYSOSTIGMINE
Donald R. Daoust, South Plainfield, N.J., assignor to Merck & Co., Rahway, N.J.
No Drawing. Filed Sept. 24, 1971, Ser. No. 183,649
Int. Cl. C12b 1/00
U.S. Cl. 195—80 R    6 Claims

ABSTRACT OF THE DISCLOSURE

A fermentation process for preparing the known compound physostigmine.

---

This invention relates to a novel process for preparing the known compound physostigmine (Merck Index, 8th ed., page 828) which is useful as an anticholinesterase agent and also useful as an anthelmintic agent.

The main object of this invention is to provide a novel process for preparing the compound physostigmine by the fermentation of nutrient media with suitable strains of a microorganism.

Previously, the only source of physostigmine was by an extraction method of natural products. The fermentation process provides a more convenient method for obtaining physostigmine since the process is independent of the conventional slow growing plant source. As such this new process offers greater control over the size of the yield. Also, this fermentation process offers the opportunity for rapid process improvement by medium modification, strain variation or by chemical extraction procedures.

The new process for preparing physostigmine comprises cultivating, under controlled conditions, a previously unknown strain of microorganism which has been named *Streptomyces griseofuscus* in an aqueous nutrient medium under aerobic conditions, preferably until substantial anthelmintic activity is imparted to the medium. The microorganism was isolated from a sample of soil from Orense, Spain. This newly isolated strain of microorganism has been designated MA-4090 in the culture collection of Merck & Co., Inc., Rahway, N.J. A culture thereof has been deposited with the fermentation section of the Northern Utilization Research Branch, U.S. Department of Agriculture at Peoria, Ill., and added to its permanent culture collection as NRRL-5324 and is available to anyone upon request.

The morphological and cultural characteristics of *Streptomyces griseofuscus* are set forth in the following table.

Cultural characteristics of *Streptomyces griseofuscus* MA-4090

Morphology.—Sporophores are long open spirals of more than 10 spores. Spores are spherical to oval, .9 micron in diameter and .9 micron wide x 1.2 microns long. Vegetative mycelium is .9 micron in width (sporulation observed and measurements taken on Czapek-Dox agar, egg albumin, glycerol-asparagine and tomato paste-oatmeal agar at 970 × magnification).

Tomato paste-oatmeal agar.—Vegetative growth—reverse: brown to dark brown; Aerial mycelium—velvety; light to dark gray (4dig)* mottled with white; Soluble pigment—none.

Glycerol-asparagine agar.—Vegetative growth—reverse: organish brown to dark brown; Aerial mycelium—velvety; mixture of light gray and white edged with dark gray (4if)*; Soluble pigment—none.

Czapek-Dox agar.—Vegetative growth—flat, translucent, thin; Aerial mycelium—thin, medium gray (4ig)*; Soluble pigment—none.

Egg albumin agar.—Vegetable growth—flat, spreading; reverse: tannish; Aerial mycelium—medium gray (5 fe)* mixed with white; soluble pigment—light tan.

Synthetic starch agar.—Vegetative growth—reverse: mixture of gray and cream; Aerial mycelium—velvety; mixture of light gray and white edges with medium gray (4ig)*; Soluble pigment—very light tan.

Nutrient starch agar.—Vegetative growth—good; Aerial mycelium; Gray mottled with white and edged with gray; Soluble pigment—slight browning of medium; Hydrolysis of starch—moderate.

Nutrient tyrosine agar.—Vegetative growth—reverse: dark reddish brown; Aerial mycelium—mixture of light gray and white edged with white; Soluble pigment—reddish brown; Decomposition of tyrosine.

Nutrient agar.—Vegetative growth—reverse: cream; Aerial mycelium—mixture of light gray and white; Soluble pigment—none.

Gelatin stab.—Vegetative growth—cream colored surface growth and sediment; Aerial mycelium—none; Soluble pigment—none; No liquefaction of gelatin.

Nutrient gelatin agar.—Vegetative growth—good; Aerial mycelium—white; Soluble pigment—none; Slight liquefaction of gelatin.

Yeast extract-dextrose agar.—Vegetative growth—reverse: tan; Aerial mycelium—Mixture of light gray and white; Soluble pigment—light tan.

Calcium malate agar.—Vegetative growth—reverse: pale cream; Aerial mycelium—sparse, grayish-white; Soluble pigment—none; Clear zone along growth streak.

Skim milk agar.—Vegetative growth—reverse: cream to gray; Aerial mycelium—mixture of light gray and white edged with grayish white; Soluble pigment—tan; No hydrolysis of casein.

Litmus milk.—Vegetative growth—heavy growth ring; Aerial mycelium—moderate; grayish white; Color—purplish blue; Complete peptonization; alkaline pH (8.05).

Skim milk.—Vegetative growth—heavy growth ring, pinkish tan; Aerial mycelium—scant, tannish white; Soluble pigment—pinkish tan; Complete peptonization; alkaline pH (8.0).

Potato.—Vegetative growth—tan; Aerial mycelium—grayish-white; Soluble pigment—none.

Loeffler's blood serum.—Vegetative growth—cream colored; Aerial mycelium—none; Soluble pigment—none; No liquefaction.

Microaerophilic growth (yeast extract-dextrose agar stab., 40 mm. deep).—Good growth on surface and along entire stab line.

Peptone-iron-yeast extract agar.—Vegetative growth—good; Aerial mycelium—thin, tannish-white; Soluble pigment—none; Melanin negative.

Temperature range (yeast extract-dextrose agar)

28° C.—Growth good
37° C.—Growth good
50° C.—No growth

Reduction of nitrates.—No reduction.

Carbohydrate utilization (Pridham-Gottlieb basal medium + 1% carbohydrate). The symbol + indicates good growth, ± indicates poor growth, and — indicates no growth on the particular carbohydrate.

| | | | |
|---|---|---|---|
| Arabinose | — | Mannitol | + |
| Cellulose | — | Mannose | + |
| Fructose | — | Raffinose | + |
| Glucose | ± | Rhammose | + |
| Inositol | + | Sucrose | + |
| Lactose | — | Xylose | — |
| Maltose | + | | |

*Color designations from Color Harmony Manual, 4th ed. 1958, Container Corporation of America, Chicago.

Final readings were taken on all medium used in taxonomic studies after three weeks incubation at 28° C. pH of media neutral (6.8–7.2).

The above description of the microorganism producing physostigmine is given as illustrative of the strain of *Streptomyces griseofuscus* which can be used in the production of physostigmine. It is to be understood that the present invention is not to be limited to organisms answering this particular description. The present invention also contemplates the use of other strains of *Streptomyces griseofuscus* which are mutants of the described organisms such as those obtained by natural selection or those produced by mutating agents, for example, X-ray irradiation, ultraviolet irradiation, nitrogen mustards and the like.

Physostigmine is produced during the aerobic fermentation of suitable aqueous media under conditions described hereinafter by strains of *Streptomyces griseofuscus*. Aqueous mediums such as those employed for the production of antibiotics are suitable for the production of physostigmine. Such media contain sources of carbon and nitrogen assimilable by the microorganisms.

In general, carbohydrates such as sugars, for example, glucose, sucrose, maltose, mannose, rhammose and the like, grains such as coats, rye, wheat, corn and the like and starches are suitable sources of assimilable carbon in the nutrient media. The exact quantity of the carbon source which is utilized in the medium will depend, in part, upon the other ingredients of the medium, but it is usually found that the amount of carbohydrate between about 1 and 6% by weight of the medium is satisfactory. These carbon sources can be used individually or several such carbon sources may be combined in the medium.

Various nitrogen sources such as yeast hydrolysates, yeast autolysates, soybean meal, casein hydrolysates, corn steep liquors, distiller's solubles, meat extract and the like are readily assimilable by the new strain of *Streptomyces griseofuscus* in the production of physostigmine. The various sources of nitrogen can be used alone or in combination in amounts ranging from 0.2 to about 6% by weight of the medium.

The following are examples of media suitable for growing *Streptomyces griseofuscus* and producing physostigmine.

MEDIUM NO. 1

Agar slant culture

| | | |
|---|---|---|
| Yeast extract | g | 10.0 |
| Glucose | g | 10.0 |
| Phosphate buffer* | ml | 2.0 |
| MgSO·7H$_2$O | g | 0.05 |
| Agar | g | 20.0 |
| Distilled H$_2$O | ml | 1000 |

*Phosphate buffer:
| | | |
|---|---|---|
| KH$_2$PO$_4$ | g | 91.0 |
| Na$_2$HPO$_4$ | g | 95.0 |
| Distilled H$_2$O | ml | 1000 |
| pH—7.0. | | |

MEDIUM NO. 2

For inoculum development

| | | |
|---|---|---|
| Ardamine (yeast autoylsate) | g | 10.0 |
| Glucose | g | 10.0 |
| Phosphate buffer* | ml | 2.0 |
| MgSO$_4$·7H$_2$O | g | 0.05 |
| Distilled H$_2$O | ml | 1000 | pH adjusted to 6.5 with NaOH.
*Same as above, Medium No. 1.

MEDIUM NO. 3

Fermentation 1

| | | |
|---|---|---|
| Meat extract | g | 3.0 |
| Casein hydrolysate (NZ amine, type E) | g | 10.0 |
| Glucose | g | 15.0 |
| Ardamine (yeast autolysate) | g | 1.0 |
| NaCl | g | 2.5 |
| CaCO$_3$ | g | 5.0 |
| Distilled H$_2$O | ml | 1000 | pH adjusted to 7.2 with NaOH.

MEDIUM NO. 4

Fermentation

| | | |
|---|---|---|
| Casein hydrolysate (NZ amine, type E) | g | 2.5 |
| Beef extract (Difco) | g | 1.0 |
| NaCl | g | 5.0 |
| Soybean meal | g | 10.0 |
| Distiller's solubles | g | 2.0 |
| Corn steep liquor (wet basis) | g | 5.0 |
| Dextrose | g | 20.0 |
| K$_2$HPO$_4$ | g | 2.0 |
| CaCO$_3$ (after pH is adjusted to 7.0) | g | 10.0 |
| Distilled H$_2$O | ml | 1000 |

The fermentation using the physostigmine producing microorganism can be carried out at temperatures ranging from about 20–38° C. For optimum results, we find it most convenient to conduct these fermentations at a temperature in the range of from about 22°–30° C. The pH of the nutrient media suitable for growing *Streptomyces griseofuscus* and producing physostigmine can vary from about 5.5 to 8.0.

Small scale fermentations are conveniently carried out by placing suitable quantities of nutrient medium in a flask employing known sterile techniques, inoculating the flask with either spores or vegetative cellular growth of a physostigmine producing strain of *Streptomyces griseofuscus*, loosely toppering the necks of the flasks with cotton and permiting the fermentation to proceed in a constant temperature room at about 28° C. on a shaker for about 2 to 3 days. For larger scale work it is preferable to conduct the fermentation in suitable tanks provided with an agitator and a means of aerating the fermentation medium. The nutrient medium is made up in the tank and after sterilization is inoculated with a suitable source of vegetative cellular growth of a physostigmine producing strain of *Streptomyces griseofucus*. The fermentation is allowed to continue for from 1 to 5 days while agitating and/or aerating the nutrient medium in a temperature range of about 22°–30° C.

The examples which follow are illustrative of the fermentation processes useful in the production of physostigmine.

EXAMPLE 1

A culture of *Streptomyces griseofuscus* strain NRRL-5324 is produced by growing the organism on a nutrient agar slant of the following composition:

| | | |
|---|---|---|
| Yeast extract | g | 10 |
| Glucose | g | 10 |
| Phosphate buffer* | ml | 2.0 |
| Magnesium sulfate heptahydrate | g | 0.05 |
| Agar | g | 20.0 |
| Distilled water | ml | 1000 |

*Phosphate buffer solution-potassium monobasic phosphate, 91.0 g., sodium dibasic phosphate, 95.0 g., distilled water, 1000 ml.

The slant is inoculated with spores and is incubated for one week at 28° C.

The culture obtained is used to inoculate three 250 ml. baffled Erlenmeyer flasks each containing 50 ml. of a sterile vegetative growth medium having the following composition:

| | | |
|---|---|---|
| Yeast autolysate (Ardamine, Yeast Products, Inc.) | g | 10.0 |
| Glucose | g | 10.0 |
| Phosphate buffer* | ml | 2.0 |
| Magnesium sulfate heptahydrate | g | 0.05 |
| Distilled water | ml | 1000 |

*Same as above, same example.

The pH of the inoculated medium is adjusted to 6.5 using dilute sodium hydroxide solution. The inoculated medium is grown with constant shaking for two days at a temperature of 28° C. to produce the vegetative form of the organism. The seed medium was stored at 4° C. for two days before use.

The vegetative inoculum is then employed to inoculate a sterile production culture medium having the following composition:

|  | G. |
|---|---|
| Meat extract | 3.0 |
| Casein hydrolysate [NZ amine, type E (Sheffield Chemical)] | 10.0 |
| Glucose | 15.0 |
| Yeast autolysate [Ardamine, Yeast Products, Inc.] | 1.0 |
| Sodium chloride | 2.5 |
| Calcium carbonate | 5.0 |

Distilled water—1000 ml.

The three-seed flask broths were pooled aseptically and used as inoculum for twelve 2-liter Erlenmeyer flasks each containing 250 ml. of the medium. Each 2.0 liter Erlenmeyer flask is inoculated with 7 ml. of the seed broth. The flasks are shaken at 28° C. on a 220 r.p.m. shaker (2-inch throw). The pH of the production medium is adjusted to 7.2 using dilute sodium hydroxide. The feremntation is allowed to proceed for three days in six of the 2.0-liter Erlenmeyer flasks. The pH of the culture medium at the end of three days is about 7.8. In the other six 2.0-liter Erlenmeyer flasks the fermentation is allowed to proceed for four days. The pH of the culture medium at the end of four days is about 8.0. At the end of the fermentation period the amount of anthelmintic activity in the medium can be determined by the assay procedure described below. The fermentation broth obtained from the four day fermentation period (1500 ml.) contains about 150 µg. of physostigmine.

By employing the same medium as described above, two production flasks of 40 ml. medium in 250 ml. Erlenmeyer flasks were each inoculated with 1 ml. of seed broth. The fermentation broth is shaken and assayed at both the three day and four day fermentation period. The pH of the culture medium gradually changes from 7.2 to 8.1 during the three-day period and from 7.2 to 8.5 during the four-day period. The amount of physostigmine in the fermentation broth is determined by the assay procedure described below. The three day fermentation broth contains about 100 µg./ml. of physostigmine whereas the four day fermentation broth contains about 150 µg./ml. of physostigmine.

EXAMPLE 2

The vegetative inoculum obtained above is also employed to inoculate a production culture medium having the following composition:

|  | G. |
|---|---|
| Casein hydrolysate [NZ amine, type E (Sheffield Chemical)] | 2.5 |
| Beef extract (Difco) | 1.0 |
| Sodium chloride | 5.0 |
| Soybean meal (Staley 4-A brand) | 10.0 |
| Distiller's solubles | 2.0 |
| Corn steep liquor (wet basis) | 5.0 |
| Dextrose | 20.0 |
| Potassium dibasic phosphate | 2.0 |
| Calcium carbonate (after the pH is adjusted to 7.0) | 10.0 |

Distilled water—1000 ml.

Three 250-ml. liter Erlenmeyer flasks, each containing 40 ml. of the production medium, is inoculated as in Example 1 and shaken on a 220 r.p.m. shaker at 28° C. One flask is assayed on each of three, four and five days fermentation period. The pH of the fermentation medium after three days is 6.2 and after four days is 6.9. At the end of each fermentation period the amount of physostigmine in the medium is determined by the assay procedure described below. The three day fermentation broth contains about 100 µg./ml. of physostigmine and the four day broth contains about 150 µg./ml. of physostigmine.

The concentration of physostigmine in the fermentation media described above varies from 10 to 400 µg. per ml.

Physostigmine can be purified and recovered by a number of procedures. One procedure comprises filtering the broth to remove the mycelia, adjusting the pH from about 7 to about 9 and then extracting with a suitable solvent, for example, chloroform, benzene, ethylacetate and the like. The solvent is then removed to afford the active substance.

Another method comprises purifying the active substance using alumina chromatography and by adsorption on suitable ion exchange resins or combinations of such procedures. The physostigmine can be isolated in the following manner: To the broth is added 0.2 lb. of diatomaceous earth filter aid per gallon of broth. The broth is adjusted to a pH of 7 with either hydrochloric acid or sodium hydroxide. The batch is agitated and filtered through a pad of diatomaceous earth filter aid.

Extraction procedure

After filtering the broth, a 1 l. portion of the filtered broth is adjusted to pH 9 with sodium hydroxide and extracted with 2 x 500 ml. of chloroform. The solution is concentrated to dryness to afford 0.229 g. of crude physostigmine. The product is dissolved in a minimum of water and filtered to remove some insoluble material. The pH is adjusted to 7.1 with dilute hydrochloric acid. Assay by *Panagrellus redivivus* indicated recovery of activity from the broth.

Adsorption on ion exchange resin.—The filtered broth (2.6 l.) is adjusted to pH 5 and passed through a column containing 130 ml. of Amberlite IRC–50 ($Na^+$) at a rate of about 10 ml./minute. The resin is washed with two column volumes of water, and the activity is eluted with 0.5 N ammonia at 5 ml./minute. Cuts of 50 ml. each were collected. The cuts were neutralized and assayed by *Panagrellus redivivus*. The activity is found in eluates No. 12–16, and these were combined and further purified by chloroform extraction and alumino chromatography. The assays indicated a 28% recovery of activity.

Alumina chromatography.—The starting material is a composite of four different samples. Three of these are chloroform extracts of the ion exchange eluates, and the fourth is a chloroform extract of filtered broth. A total of 5.5 l. of broth was processed to obtain these samples. The combined sample, containing about 256 mg. of solid, is freeze dried. The residue is dissolved in 2 ml. of methanol. Alumina (4 g.) is added to the solution, and the mixture is dried. This mixture is charged to the top of a column containing 75 g. of alumina in the solvent system n-hexane/benzene/ethyl acetate (2:1:6) (Column I.D. ca. 2.1 cms., bed height ca. 22 cm.). The column is developed with the solvent system at a rate of 0.5–1.0 ml./minute. The product in the cuts can be followed by placing a drop of the eluate on a solica gel TLC plate containing fluorescent indicator and observing under U.V. light. The following Table I gives the results of procedure:

TABLE I

| Cut No. | Vol. (ml.) | U.V.[1] | Fluor.[1] | Weight (mg.) | $E_{1\ cm.}^{1\%}$ (252 nm.)[2][3] |
|---|---|---|---|---|---|
| 1 | 45 | − | − |  |  |
| 2 | 10 | − | − |  |  |
| 3 | 10 | − | − |  |  |
| 4 | 10 | − | + | 1.4 |  |
| 5 | 10.5 | + | + | 26.3 | 382 |
| 6 | 10 | + | − | 39.2 | 406 |
| 7 | 10 | + | − | 25.2 | 389 |
| 8 | 10 | + | − | 10.4 | 450 |
| 9 | 10 | + | − | 5.2 | 403 |
| 10 | 10 | V.L. | − | 3.6 | 310 |

[1] This is the observation of the thin layer chromatography (TLC) plate under ultraviolet light (U.V.) (plate not developed). Cut No. 5 probably contained relatively pure product, but it appeared to contain a second material which fluoresced under U.V.

[2] The product probably elutes as free base. Addition of hydrochloric acid caused this peak to shift to about 245 nm.

[3] $E_{1\ cm.}^{1\%}$ of physostigmine free base in methanol is about 397 at 251 nm.; when excess sodium hydroxide is added, the $E_{1\ cm.}^{1\%}$ of physostigmine is about 436 at 253 nm.

Cuts number 6–8 are combined and evaporated to dryness. The residue is suspended in water and dilute hydrochloric acid is added to dissolve the material. The solution is adjusted to a final pH of 6.65 with dilute hydrochloric acid and a volume of 7.5 ml. (10 mg./ml.). This solution contains essentially pure physostigmine.

Anthelmintic assay with *Panagrellus redivivus*

(A) Preparation of *Panagrellus Redivivus* stock cultures.—Mix 7 grams of Gerber's oatmeal with 30 ml. of a yeast suspension prepared as follows: 1 gram of Fleischmann's active dry yeast (Standard Brands, Inc., New York) is placed in 100 ml. of sterile water. The suspension is mixed thoroughly to dissolve the yeast and the suspension is incubated at 37° C. with shaking for one hour. The mixture of yeast suspension and oatmeal is placed in a Petri dish and the dish is placed into a shallow plate containing a shallow layer (1 cm. deep) of Fenwick's salt solution. Then inoculate the mixture with 1 ml. of the stock culture of *Panagrellus redivivus* previously prepared. (Fenwick's salt solution: NaCl, 7.0 g.; KCl, 1.5 g.; $MgCl_2 \cdot 6H_2O$, 0.82 g.; $CaCl_2 \cdot 2H_2O$, 0.58 g. and distilled water, 1 l.). The dish is covered with aluminum foil and incubated at 25° C. for approximately 1 week.

The nematodes proliferate to such an extent that they swarm over the sides of the Petri dish and accumulate in the Fenwick's solution where they can be collected.

The yeast and other debris can be eliminated by Baermann treatment of the nematodes or by several repeated washes.

The nematodes collected from the Fenwick's solution can be stored in a shallow layer of fresh Fenwick's solution at 9° C. for 1–2 months. These are used to prepare new stock cultures and for running tests.

(B) Preparation of nematode inoculum.—A suitable dilution of the stock culture is prepared so that 1 ml. of the dilution contains approximately 10,000 nematodes.

(C) Inoculation of culture medium.—After several batches of medium have been prepared as described above, 2 ml. of the nematode suspension (10,000/ml.) is added to each batch. In order to prevent caking of the oatmeal and insure proper distribution of the nematode population it is recommended that no more than 7 g. oatmeal and 15 ml. of yeast suspension be mixed in any one batch.

The nematodes should be mixed thoroughly with the medium using a stirring rod. Failure to distribute nematodes evenly will lead to false positive results.

(D) Assay of *Streptomyces griseofuscus* cultures.—*Streptomyces griseofuscus* cutures are grown on the surface of agar plates. Plugs of the culture are removed from the plate with a No. 4 cork borer and placed into each of two separate cups of the assay plate. The plug is crushed with a glass rod. This crushing insures better distribution in the nematode culture medium.

The nematode culture medium is added to the cup to fill the cup approximately ¾ full. The medium and the crushed plug are then mixed.

The assay tray is placed in a moist dish, covered and incubated at 25° C. for four days.

(E) Scoring the assay.—After four days of incubation the assay cultures are examined. The tray is removed and examined in the reflected light of a fluorescent light. The control cultures will be found to be swarming vigorously at the surface with nematodes. The effect resembles rain dropping on a water surface. Frequently, the streptomycete will overgrow the surface of the assay medium, thus hampering observation. This can be circumvented by stirring the nematode medium vigorously with a glass rod for several seconds and then observing the surface for nematode activity. Physostigmine at a minimum concentration of 10 μg./ml. is found to completely eliminate the nematode.

Structure determination

Physostigmine is a known compound having a molecular weight (M.W.) of 275 and a molecular formula of $C_{15}H_{21}N_3O_2$. The product isolated from the fermentation broth was determined to be physostigmine from the following spectroscopic data:

(1) The molecular weight of 275 was determined by mass spectrometric analysis of the natural product (M+ 275), of its mono-trimethylsilyl derivative (M+ 347) and of its mono-nonadeuterotrimethylsilyl derivative (M+ 356). These derivatives showed also that the natural product contains only one active hydrogen.

(2) The elemental composition was determined by high-resolution mass spectrometric measurement at m./e. 275 and found to be $C_{15}H_{21}N_3O_2$ (found 275.1636, calculated 275.1634).

(3) A fragment of mass 218.1443 ($C_{13}H_{18}N_2O$, calculated 218.1419) with an infrared absorption at ~1730 cm.$^{-1}$ and the presence of several N—$CH_3$ signals in the NMR spectra of the isolated product indicated the presence of a methyl carbamoyl group. This interpretation was supported by analogous fragmentation of the trimethylsilyl-derivatives (m./e. 290 and 299, respectively) with typical retention of the $(CH_3)_3Si$-group with the daughter ion:

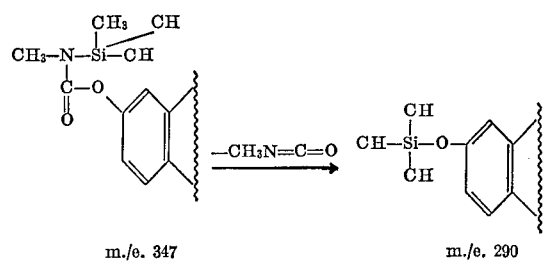

m./e. 347     m./e. 290

(4) Abundant fragments of mass 174.0939 ($C_{11}H_{12}NO$, calculated 174.0919) and 161.0835 ($C_{10}H_{11}NO$, calculated 161.0841) were in good agreement with the proposed structure.

(5) NMR signals ($D_2O$, relative to HMDS) at 8.52 (S, 3H), 7.20 (S 3H), 7.10 (S, 3H), 7.88 (S, 3H), 7.61 (m, 2H), ~7.1 (m, 1H), ~6.6 (m, 1H), 4.98 (S, 1H), 3.31 (d, 10 Hz. 1H), 3.03 (d, Hz, 1H) and 2.98τ (S, 1H) and spin decoupling data were interpreted as shown in terms of the physostigmine structure

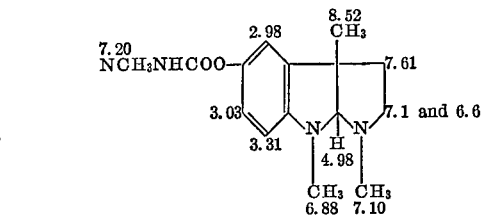

Various changes and modifications in the medium, strain or the extraction procedure will occur to those skilled in the art and to the extent that such changes and modifications are embraced by the foregoing description and by the appended claims it is to be understood that such changes and modifications constitute part of this invention.

What is claimed is:

1. A process for producing physostigmine which comprises cultivating *Streptomyces griseofuscus* in an aqueous nutrient medium under aerobic conditions.

2. A process according to claim 1 for producing physostigmine which comprises cultivating *Streptomyces griseofuscus* in an aqueous nutrient medium under conditions until substantial anthelmintic activity is imparted to said medium.

3. A process according to claim 1 wherein the fermentation is conducted at a temperature in the range of 20°–38° C. for a period of about 1–5 days.

4. A process according to claim 1 wherein the fermentation is conducted at a temperature in the range of 22°–30° C. for a period of about 3–4 days.

5. A process according to claim 1 wherein the pH of the aqueous nutrient medium is in the range of about 5.5 to 8.0.

6. A process according to claim 1 wherein the aqueous nutrient medium contains about 1% to 6% by weight of carbohydrate and between 0.2% to 6% by weight of a suitable nitrogen source.

References Cited

Merck Index, 8th ed. p. 828.

LIONEL M. SHAPIRO, Primary Examiner

R. J. WARDEN, Assistant Examiner